(12) United States Patent
Koegel

(10) Patent No.: US 9,827,625 B2
(45) Date of Patent: Nov. 28, 2017

(54) POWER TOOL ARRANGEMENT WITH A SPRING LOADED HOSE

(75) Inventor: Jan Koegel, Oak Park, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1488 days.

(21) Appl. No.: 13/104,586

(22) Filed: May 10, 2011

(65) Prior Publication Data
US 2012/0285308 A1    Nov. 15, 2012

(51) Int. Cl.
B23D 59/00    (2006.01)
F16L 11/115    (2006.01)
F16L 27/111    (2006.01)

(52) U.S. Cl.
CPC .......... B23D 59/006 (2013.01); F16L 11/115 (2013.01); F16L 27/111 (2013.01); Y10T 83/207 (2015.04); Y10T 83/242 (2015.04); Y10T 83/773 (2015.04); Y10T 83/7763 (2015.04); Y10T 83/7772 (2015.04)

(58) Field of Classification Search
CPC ..... B23D 59/006; F16L 11/115; F16L 27/111; B23Q 11/0042; B23Q 11/0046; Y10S 29/064; Y10S 29/086; Y10T 83/207; Y10T 83/242; Y10T 83/773; Y10T 83/7763; Y10T 83/7768; Y10T 83/7772; Y10T 83/7776; Y10T 83/778; Y10T 83/7784; Y10T 408/50
USPC ...... 83/485, 486, 486.1, 487–489, 100, 168, 83/477.2; 15/315; 29/DIG. 64, DIG. 86; 138/129, 131; 144/252.1, 252.2; 451/456; 408/67
See application file for complete search history.

(56) References Cited

U.S. PATENT DOCUMENTS

| 2,044,481 | A | * | 6/1936 | Manley et al. | 144/252.1 |
| 2,394,556 | A | * | 2/1946 | Martin | 451/456 |
| 2,929,177 | A | * | 3/1960 | Sheps | 451/456 |
| 3,648,508 | A | * | 3/1972 | Hougen | 72/325 |
| 3,672,785 | A | * | 6/1972 | Byrne | 408/206 |
| 3,826,288 | A | | 7/1974 | Cooper et al. | |

(Continued)

FOREIGN PATENT DOCUMENTS

| AU | 2010214791 A1 | 3/2011 |
| CN | 1590050 | 3/2005 |

(Continued)

OTHER PUBLICATIONS

English Translation of First Office Action and Search report from Corresponding Chinese Application No. 201280033895.8, dated Jul. 24, 2015 (6 pages).

*Primary Examiner* — Clark F Dexter
(74) *Attorney, Agent, or Firm* — Maginot Moore & Beck LLP

(57) ABSTRACT

A power tool arrangement includes a frame having an outlet. A power tool is coupled to the frame and includes a movable working element configured to engage a work piece. A hose includes first and second opposite ends and a biasing device configured to bias the hose into a longitudinally compressed position. The first end is coupled to the outlet. The second end is coupled to the working element such that the second end follows the movement of the working element and the hose thereby moves between the longitudinally compressed position and a longitudinally expanded position.

9 Claims, 15 Drawing Sheets

(56) References Cited

U.S. PATENT DOCUMENTS

| | | | |
|---|---|---|---|
| 3,882,598 A * | 5/1975 | Earle et al. | 30/390 |
| 4,022,182 A | 5/1977 | Lenkevich | |
| 4,270,427 A * | 6/1981 | Colberg et al. | 83/473 |
| 4,276,799 A * | 7/1981 | Muehling | 83/473 |
| 4,711,609 A | 12/1987 | Seefluth | |
| 4,830,550 A * | 5/1989 | Carlson | B23B 45/003 408/102 |
| 5,100,270 A * | 3/1992 | Dowdle et al. | 409/132 |
| 5,445,056 A * | 8/1995 | Folci | 83/100 |
| 5,733,081 A * | 3/1998 | Dowdle et al. | 409/137 |
| 5,819,619 A * | 10/1998 | Miller et al. | 83/100 |
| 5,934,845 A * | 8/1999 | Frey | 408/68 |
| 6,065,909 A * | 5/2000 | Cook | 408/206 |
| 6,427,570 B1 * | 8/2002 | Miller et al. | 83/100 |
| 6,851,898 B2 | 2/2005 | Ege et al. | |
| 6,948,527 B2 * | 9/2005 | Ragner et al. | 138/119 |
| 7,549,448 B2 * | 6/2009 | Ragner | 138/119 |
| 7,559,268 B2 * | 7/2009 | Sasaki et al. | 83/100 |
| 7,882,771 B2 * | 2/2011 | Sasaki et al. | 83/100 |
| 2002/0141836 A1 | 10/2002 | Ege et al. | |
| 2003/0098084 A1 * | 5/2003 | Ragner et al. | 138/129 |
| 2006/0070679 A1 * | 4/2006 | Ragner | 138/119 |
| 2006/0185484 A1 * | 8/2006 | Sasaki et al. | 83/100 |
| 2009/0249929 A1 * | 10/2009 | Sasaki et al. | 83/100 |

FOREIGN PATENT DOCUMENTS

| | | | |
|---|---|---|---|
| JP | 2004-69031 | * | 3/2004 |
| JP | 2008075605 A | | 4/2008 |
| WO | 9520440 A1 | | 8/1995 |

\* cited by examiner

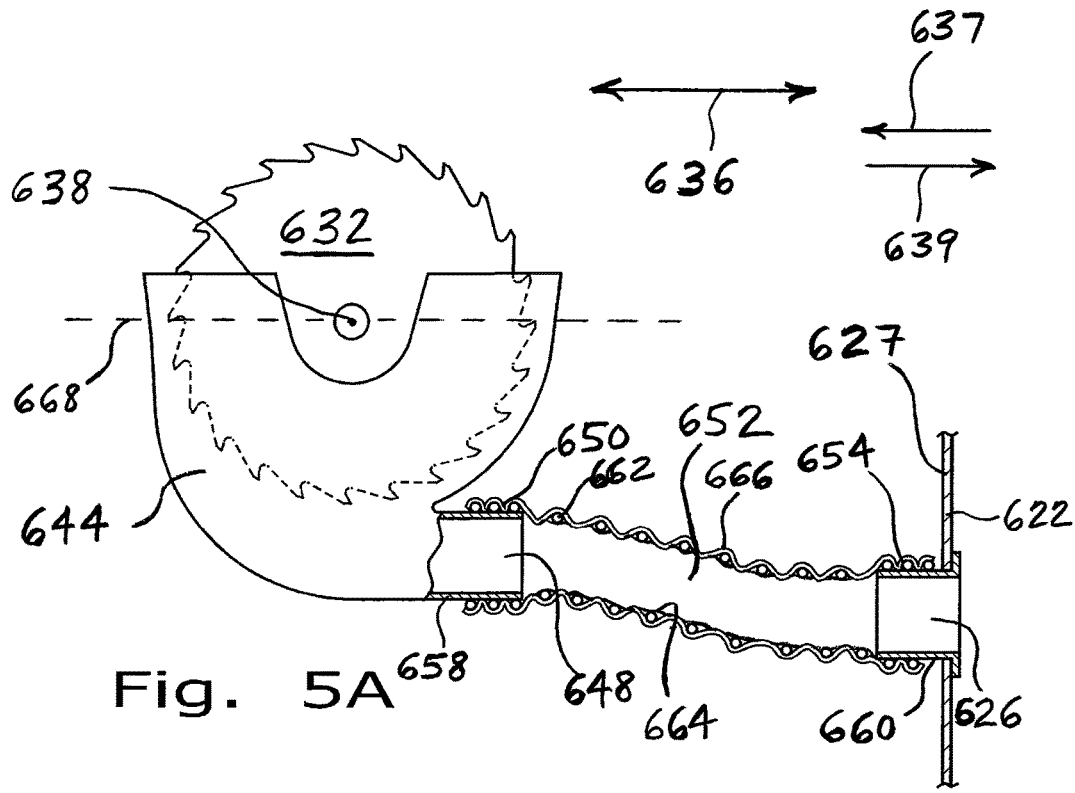
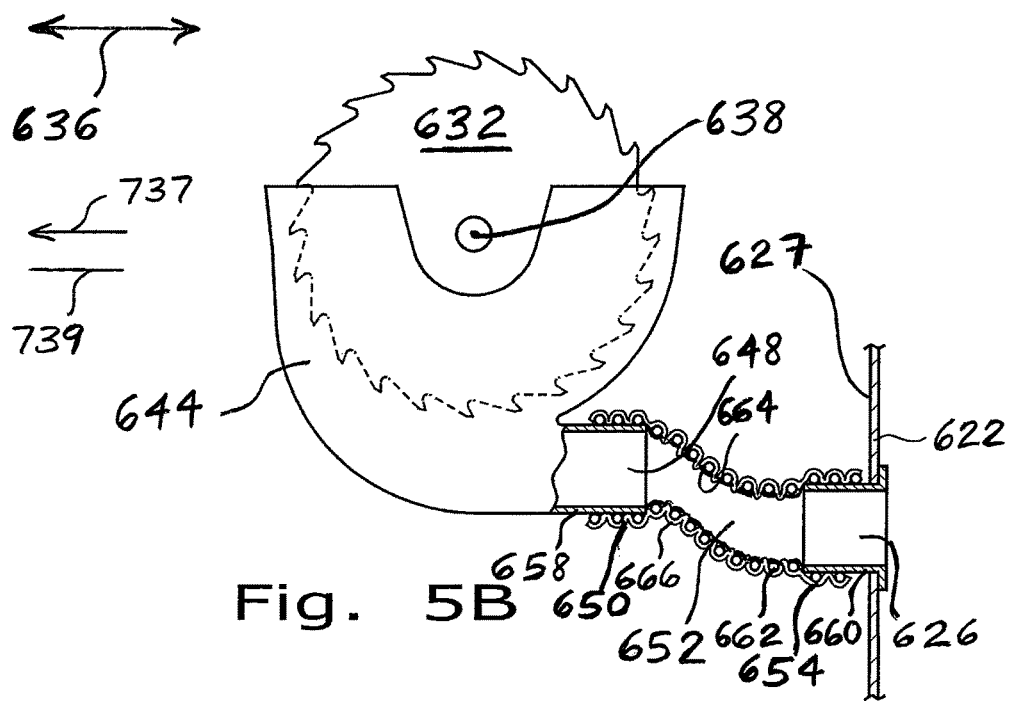

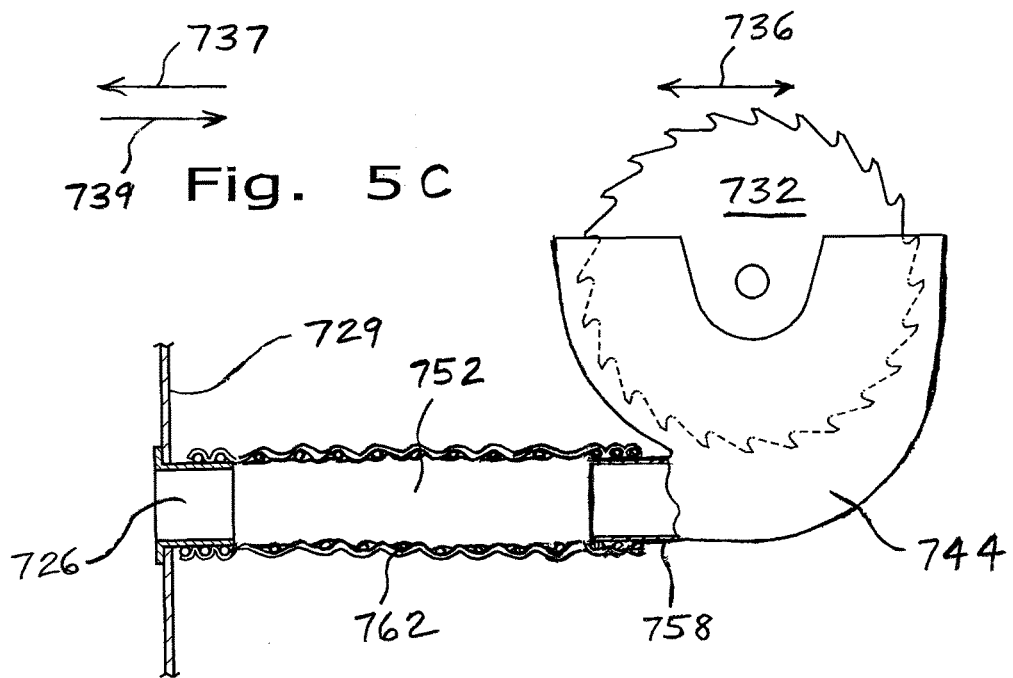
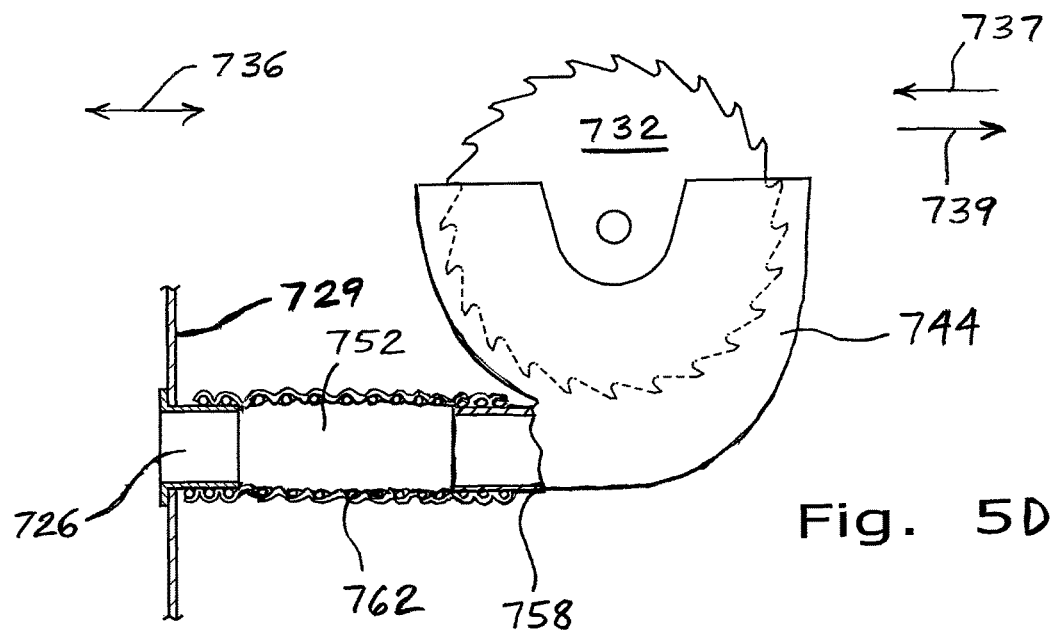

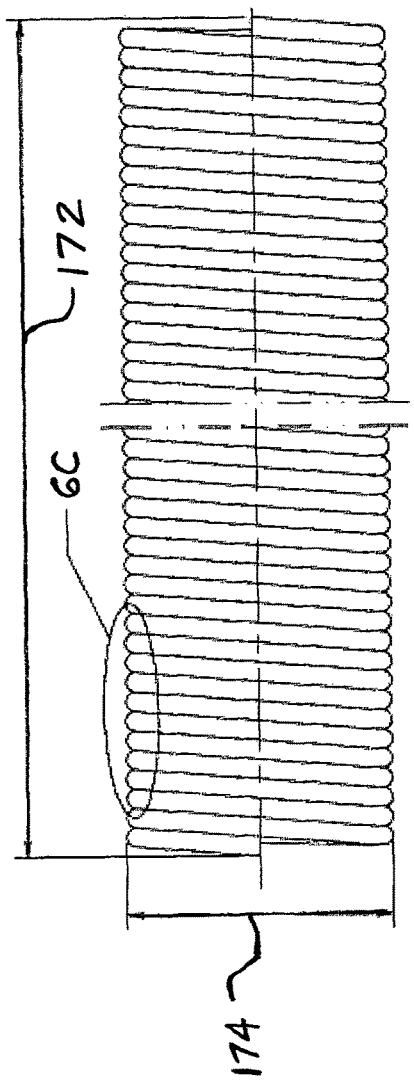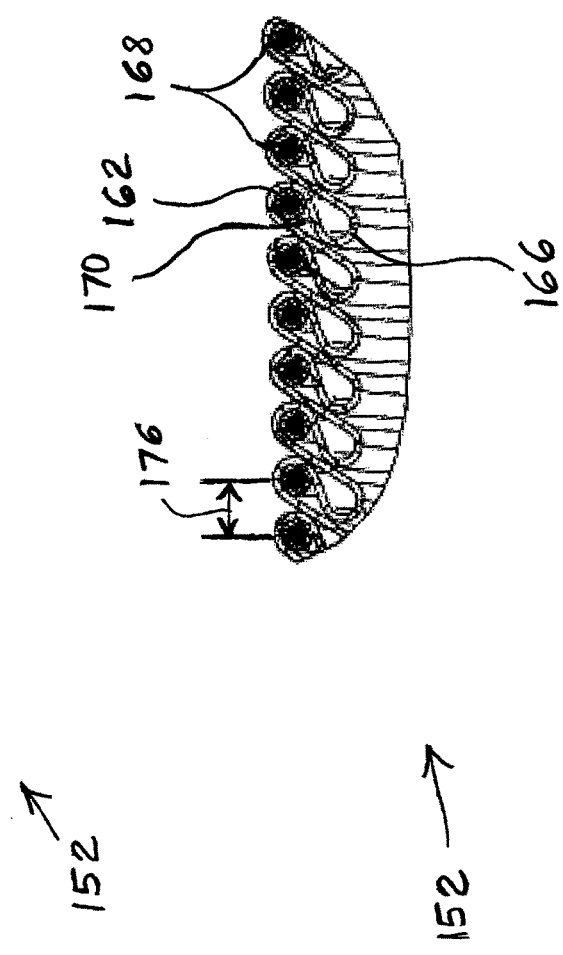

POWER TOOL ARRANGEMENT WITH A SPRING LOADED HOSE

BACKGROUND

1. Field of the Invention

The patent relates to the field of power tools and more particularly to the use of dust collection systems in connection with power tools.

2. Description of the Related Art

Power tools often create dust, debris or loose particles as the working element of the power tool engages a work piece. For example, a power saw may create saw dust as the blade cuts wood. Thus, it is known for a vacuum and a hose to be provided in association with the power tool so that the vacuum can collect the debris through the hose. In the case of air driven (e.g., pneumatic) tools, a hose may alternatively carry compressed air to the tool from a compressor. Despite the utility of the hose, it is desirable for power tool designers to construct the power tool apparatus as compact as possible. To this end, designers of power tools attempt to make the dimensions and footprint of the power tool as small as possible. This provides for ease of transport and storage, and reduces space utilized at a work site. A problem is that the hose hangs loose such that it adds to the footprint of the power tool apparatus and may possibly be damaged by the power tool.

What is neither disclosed nor suggested by the prior art is a power tool apparatus equipped with a hose such that the hose does not add significantly to the footprint of the apparatus and does not get in the way of the power tool.

SUMMARY

The present invention may provide a power tool arrangement in which a movable power tool is coupled to one of two opposite ends of a spring loaded hose. The spring may bias the hose into a longitudinally compressed position or state. The other end of the hose may be in fluid (e.g., air flow) communication with a source of compressed air or with a vacuum. As the power tool moves away from the source of compressed air or the vacuum, an expansive force may be exerted on the hose and may overcome the force of the spring, thereby causing the hose to longitudinally expand and causing an attached end of the hose to follow the movement of the tool. As the power tool moves back toward the source of compressed air or the vacuum, the force of the spring may cause the hose to longitudinally compress and maintain a minimal footprint. Even if used in conjunction with a hand power tool that a user carries in his hand, the invention may reduce the length of hose that hangs in the air and that is thus subject to damage or to getting snagged on other equipment or fixtures.

If the hose is connected to a vacuum, the hose may carry dust or debris (e.g., saw dust, metal chips, cement dust or dust/debris from tile cutting) away from the tool and to the vacuum or any other kind of collection device e.g. bucket. On the other hand, if the hose is connected to a source of compressed air, then the hose may carry the compressed air to a pneumatic tool for driving the operation of the tool.

Because the length of the hose may be minimized for each position of the power tool, air leakage into or out of the hose may be kept very low by the present invention. The low hose length may also provide high efficiency in carrying air from one end of the hose to the other end. The inventive hose may also cover and/or channel elongate, flexible elements such as cords or wires.

In one aspect, the present invention includes a power tool arrangement having a frame with an outlet. A power tool is coupled to the frame and includes a movable working element configured to engage a work piece. A hose includes first and second opposite ends and a biasing device that biases the hose into a longitudinally compressed position. The first end is coupled to the outlet. The second end is coupled to the working element such that the second end follows the movement of the working element and the hose thereby moves between the longitudinally compressed position and a longitudinally expanded position.

In another aspect, the present invention includes a power tool arrangement having a power tool with a working element configured to engage a work piece. A hose has first and second opposite ends and a biasing device that biases the hose into a longitudinally compressed position. The first end is fluidly coupled to the vacuum device. The second end is connected to the working element such that the second end follows the working element as the working element moves back and forth, and the hose thereby undergoes longitudinal compression and longitudinal expansion.

In still another aspect, the present invention includes a power tool arrangement having a pneumatic power tool and an air compressor. A hose includes first and second opposite ends and a biasing device that biases the hose into a longitudinally compressed position. The first end is fluidly coupled to the air compressor. The second end is fluidly coupled to the power tool such that the second end follows the power tool as the power tool undergoes movement in back and forth directions, and the hose thereby undergoes longitudinal compression and longitudinal expansion.

In a further aspect, the present invention includes a power tool arrangement having a power tool with a working element which engages a work piece. The working element is translatable in first and second directions. A hose includes first and second opposite ends. The first end is fluidly coupled to a vacuum or to an air compressor. The second end is connected to the working element such that the second end follows the working element as the working element translates in the first and second directions. The hose includes a biasing device which biases the hose into a longitudinally compressed position and thereby drives the translation of the working element in the first direction, or which biases the hose into a longitudinally extended position and thereby drives the translation of the working element in the second direction.

The present invention may be applied to many different varieties of benchtop power tools, hand power tools, and accessories related to benchtop power tools and hand power tools. Examples of tools to which the invention may be applied include, without limitation, impact drills, jig saws, vacuums, table saws with a sliding carriage (i.e., push-pull saws), sliding miter saws, dry cutters, cut off saws, and stationary routers.

A power tool arrangement according to the invention may include a hose that has an integrated spring. The force provided by the spring may tend to squeeze the hose into a compressed position, yet allow the hose to expand in response to a force that is great enough to overcome the force of the spring. Alternatively, it is also possible within the scope of the invention for the spring that is integrated into the hose to be a compression spring that tends to stretch the hose into an expanded position, yet allow the hose to compress in response to a force that is great enough to overcome the force of the spring.

In another embodiment, the spring is not a mechanical spring, but rather is a pneumatic spring. In this embodiment, the hose may include a hollow "spring" chamber that a connected vacuum device may apply a negative pressure to, thereby causing the hose to compress. Alternatively, an air compressor may apply a positive pressure to the hollow spring chamber, thereby causing the hose to expand.

The invention may further be applied to industrial power tools that may hang from a ceiling and that include a dust extraction device or cable holder. The inventive hose may cover (e.g., bundle) any kind of elements that need to be transferred through space, or that need cords to make movements relative to other components of the power tool. Attachments may be connected to the spring loaded hose that allow parts to be bundled/connected or held/retained.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 5A is a side, fragmentary view of a push pull power saw arrangement in accordance with another embodiment of the present invention with the hose in an expanded position;

FIG. 5B is a side, fragmentary view of the push pull power saw arrangement of FIG. 5A with the hose in a compressed position;

FIG. 5C is a side, fragmentary view of a push pull power saw arrangement in accordance with yet another embodiment of the present invention with the hose in an expanded position;

FIG. 5D is a side, fragmentary view of the push pull power saw arrangement of FIG. 5C with the hose in a compressed position;

FIG. 6B is a side, fragmentary view of another embodiment of a hose that may be suitable for use in conjunction with at least some embodiments of the present invention;

FIG. 6C is a side, sectional view of area 6C in FIG. 6B;

Figure 1:
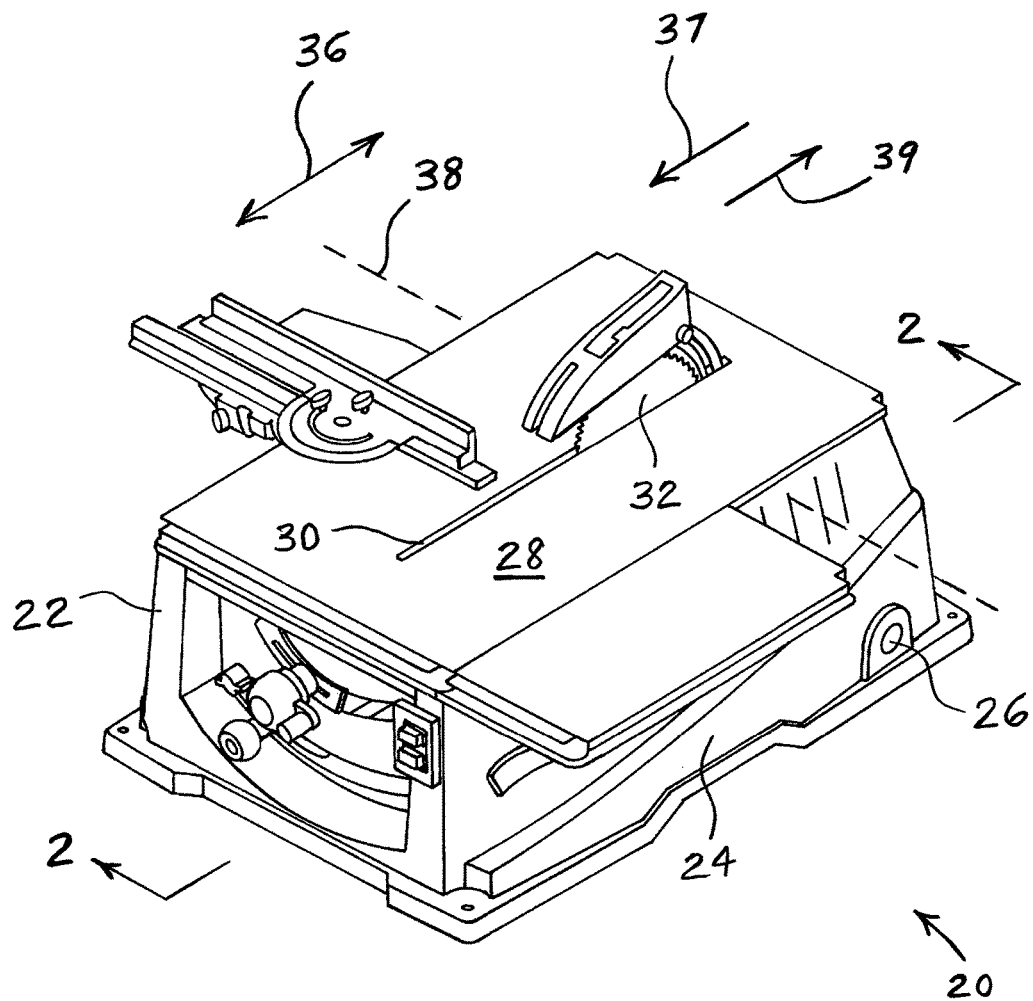
FIG. 1 is top perspective view of a push pull power saw arrangement in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIG. 1, there is shown one embodiment of a push-pull saw 20 of the present invention. Saw 20 includes a housing or frame 22 having a side wall 24 with a vacuum port or dust outlet 26. Vacuum port 26 may include a circular throughhole that extends through side wall 24. Frame 22 also includes a table top or top wall 28 including a throughslot 30. Within frame 22, and mechanically coupled to frame 22, is a power tool including a translatable working element in the form of a vertically oriented circular blade 32, a portion of which extends through the throughslot 30. Blade 32 may be translatable in the sense that a carriage 34 (FIG. 2) may move blade 32 in back and forth directions indicated by double arrow 36. In a specific embodiment, carriage 34 and blade 32 move in direction 37 when making a cross cut, and, after the cross cut, carriage 34 and blade 32 may be pulled back in direction 39 automatically. The sliding undercarriage 34 is not visible in FIG. 1 as it is underneath top wall 28. Blade 32 may rotate about an axis 38 and partially extend through throughslot 30 to engage (e.g., cut) a work piece such as a piece of wood that is placed on top wall 28.

Figure 2:
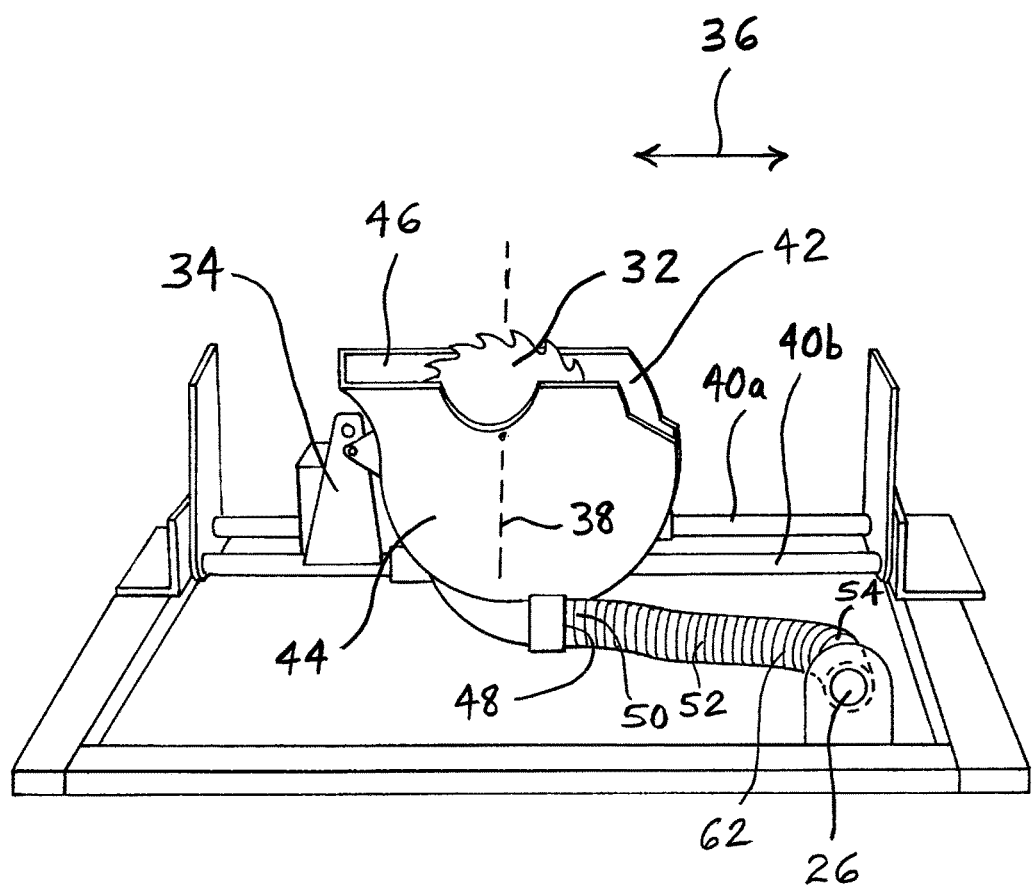
FIG. 2 is a right side view of the push pull power saw arrangement of FIG. 1 along line 2-2 with the frame removed.

As illustrated in FIG. 2, carriage 34 rides on sliding rods or rails 40*a-b* in carrying blade 32 in back and forth directions of translation 36. Blade 32 is received within a disc-shaped recess 42 in a saw dust chamber 44. Chamber 44 includes a top opening 46 that enables blade 32 to partially extend through the throughslot 30 and engage the work piece. Near the bottom of chamber 44 is an opening 48 sealingly connected to one end 50 of a spring-loaded hose 52. Thus, end 50 of hose 52 may have a fixed position relative to blade 32. An opposite end 54 of hose 52 is sealingly connected to vacuum port 26. Hose 52 may include an integrated extension coil spring 62 indicated only schematically in FIGS. 2-4, but described in more detail below with reference to FIG. 6A. Spring 62 may bias hose 52 into a longitudinally compressed position.

Figure 3:
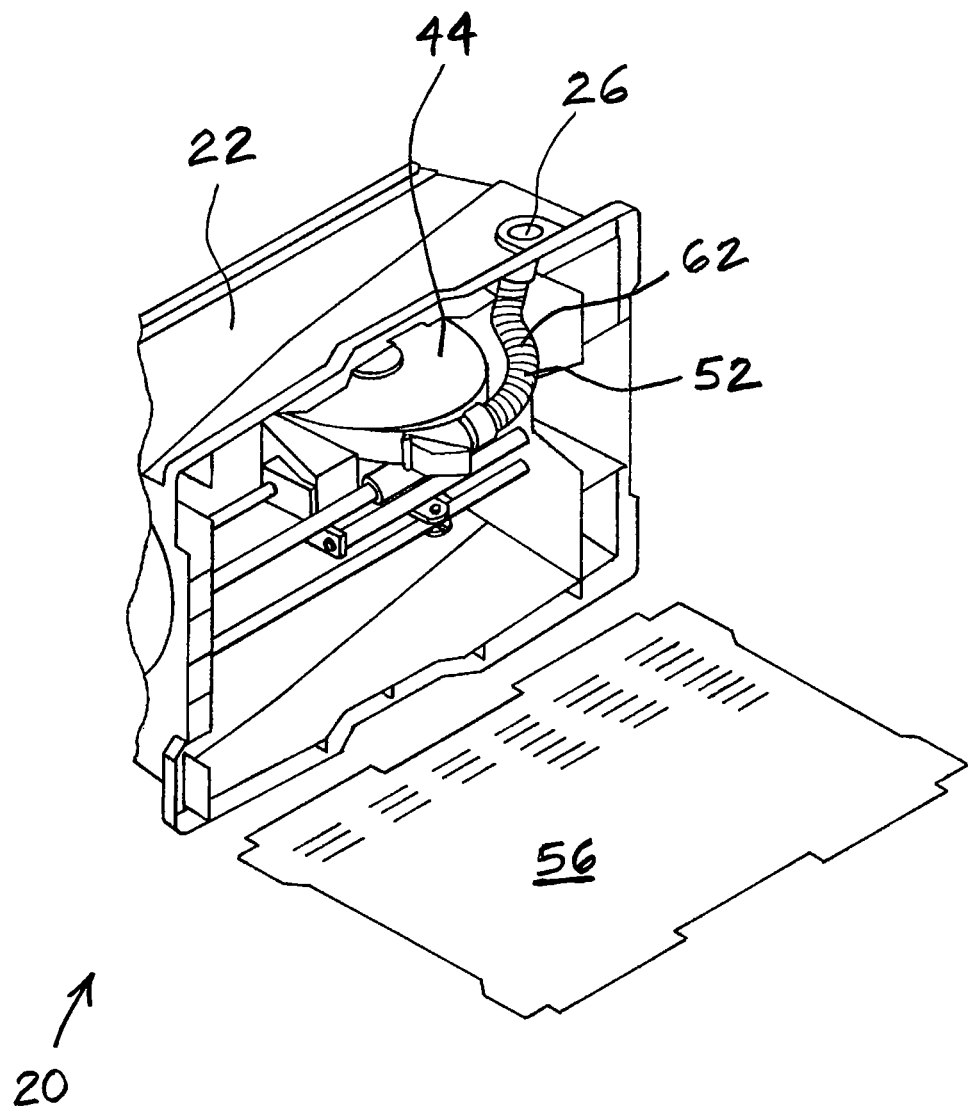
FIG. 3 is a bottom perspective view of the push pull power saw arrangement of FIG. 1 with the bottom wall detached.
Figure 4:
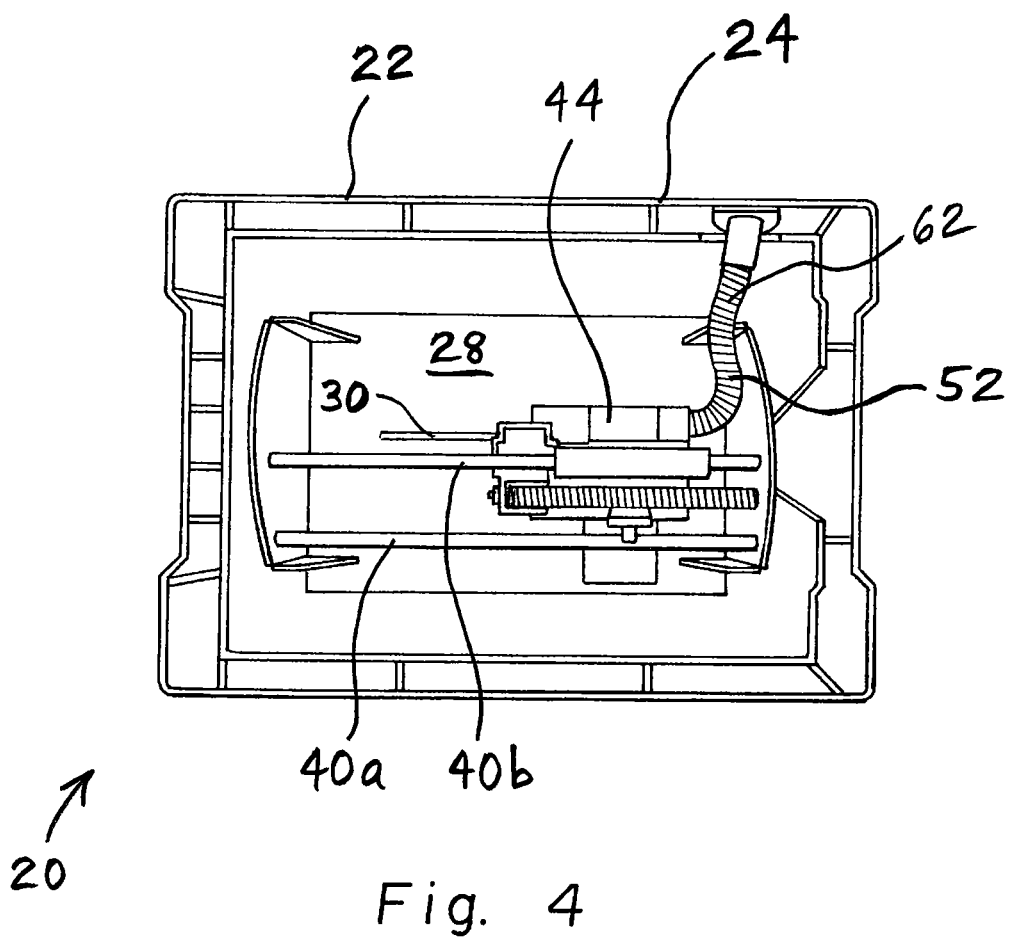
FIG. 4 is a bottom view of the push pull power saw arrangement of FIG. 1 with the bottom wall removed.

FIG. 3 provides a perspective view of saw 20 with a bottom wall 56 of frame 22 removed. FIG. 4 provides a plan view of saw 20 with bottom wall 56 of frame 22 removed.

Figure 6A:
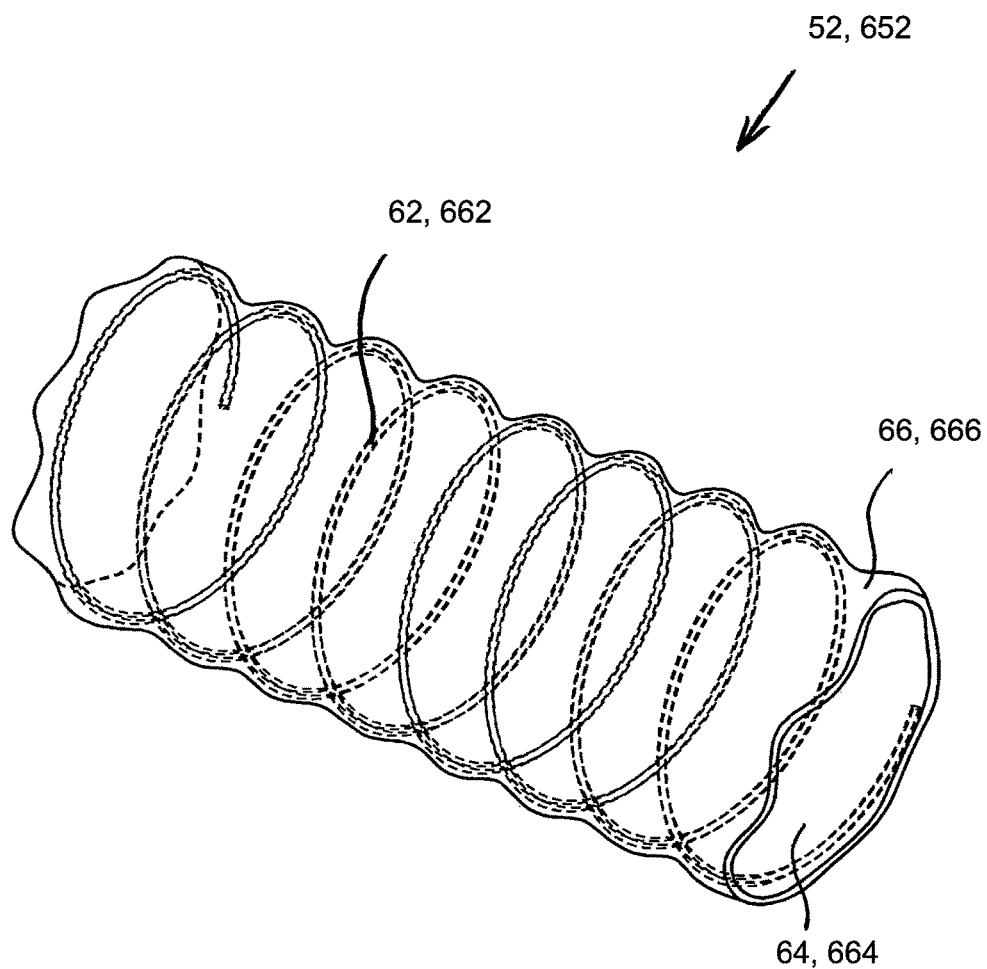
FIG. 6A is a perspective, fragmentary view of one embodiment of a hose that may be suitable for use in conjunction with at least some embodiments of the present invention.

FIGS. 5A-B illustrate another embodiment which may be identical to the embodiment of FIGS. 1-4, except that the outlet or vacuum port is in a rear wall of the frame instead of in a side wall of the frame. More particularly, hose 652 including spring 662 may be identical to hose 52 including spring 62. However a port 626 is in a rear wall 627 of frame 622 instead of in a side wall. Thus, hose 652 may be aligned with the back and forth directions of movement 636 of blade 632. Hose 652 may include opposite ends 650, 654. As best shown in a comparison of FIGS. 5A-B, hose 652 is movable between an expanded position shown in FIG. 5A and a contracted or compressed position shown in FIG. 5B as blade 632 moves back and forth in directions 636. FIG. 6A illustrates a portion of hose 652 with an integrated wire spring in the expanded position. Chamber 644 includes a cylindrical coupling 658 that defines opening 648. Cylindrical coupling 658 may be snugly received within one end of hose 652. Vacuum port 626 may include another cylindrical coupling 660 which may be snugly received within another end of hose 652. For example, couplings 658, 660 may be very tight or close fitting within respective ends of hose 652. Further, the ends of hose 652 may be sized to connect with opening 648 and port 626. In one embodiment, either of the ends of hose 652 can be interchangeably connected to opening 648 and port 626. Thus, hose 652 remains in sealed fluid communication with both chamber 644 and vacuum port 626 throughout the expansion and compression of hose 652.

Hose 652 may include an extension coil spring 662 surrounding an inner flexible plastic layer 664 of hose 652. An outer flexible plastic layer 666 of hose 652 may be wrapped around spring 662. Spring 662 may squeeze one end of hose 652 around cylindrical coupling 658, and may squeeze another end of hose 652 around cylindrical coupling 660. In one embodiment, spring 662 may be formed of metal.

Spring 662 may operate as a biasing device that biases the hose into the longitudinally compressed position illustrated in FIG. 5B. One end of hose 652 is coupled to vacuum port 626, and the other end of hose 652 is coupled via chamber 644 to the tool's working element (e.g., blade 632) such that the hose end that is coupled to the working element may follow the translation of blade 632 in back and forth directions 636. Thus, as the carriage moves blade 632 in back and forth directions 636, while possibly rotating about axis 638, hose 652 moves between the longitudinally compressed position of FIG. 5B and the longitudinally expanded position of FIG. 5A. As described above, spring 662 may produce a biasing force of a magnitude that can be overcome by an actuating force exerted on blade 632 such that hose 652 expands in response to the actuating force.

In addition to translating in directions 626, blade 632 may also make other types of movements that may be followed by hose end 650. For example, blade 632 may pivot or tilt about an axis 668 (FIG. 5A) that is parallel to directions 636 so that blade 632 is positioned to make beveled cuts in the work piece. Hose end 650 may follow these pivoting movements of blade 632 about axis 668 as well as the translating movements of blade 632 in directions 636.

Vacuum ports 26, 626 may be fluidly connected to a vacuum device (not shown) which may draw saw dust and/or debris through hoses 52, 652 via suction. In another embodiment, however, ports 26, 626 are not connected to a vacuum, but rather is a passive outlet that funnels or otherwise directs the saw dust and/or debris away from blades 32, 632 and out of frames 22, 622 possibly into a bag (not shown) in which the saw dust and/or debris is collected. Springs 62, 662 may maintain hoses 52, 652 in substantially linear positions such that the entire paths from openings 48, 648 to outlets 26, 626 through hoses 52, 652 are downhill. Thus, the sawdust and/or other debris may fall, cascade, and/or be carried by the force of gravity from openings 48, 648 to outlets 26, 626.

As mentioned above, hose 652 may be aligned with the back and forth directions of movement 636 of blade 632. Similarly to the embodiment of FIGS. 1-4, blade 632 may move in direction 637 when making a cross cut, and, after the cross cut, blade 632 may be pulled back in direction 639 automatically. In one embodiment, the force exerted by spring 662 may be such that it is spring 662 that automatically pulls back blade 632 in direction 639 after a cross cut. It is possible that, in the absence of any motor-driven or manual force exerted on blade 632 in either of directions 636, the force exerted by spring 662 is enough to pull blade 632 back in direction 639 after blade 632 has been actuated in direction 637 to make a cross cut. This force may be exerted on blade 632 by spring 662 via coupling 658, chamber 644 and an axle (not shown) that couples chamber 644 to blade 632.

In another embodiment, illustrated in FIGS. 5C-D, extension spring 662 is replaced with a compression spring 762, and port 626 in back wall 627 is replaced with port 726 in front wall 729. In this embodiment too, hose 752 may be aligned with the back and forth directions of movement 736 of blade 732. Similarly to the embodiment of FIGS. 5A-B, blade 732 may move in direction 737 when making a cross cut, and, after the cross cut, blade 732 may be pushed back in direction 739 automatically. In one embodiment, the force exerted by spring 762 may be such that it is spring 762 that automatically pushes back blade 732 in direction 739 after a cross cut. It is possible that, in the absence of any motor-driven or manual force exerted on blade 732 in either of directions 736, the force exerted by spring 762 is enough to push blade 732 back in direction 739 after blade 732 has been actuated in direction 737 to make a cross cut. This force may be exerted on blade 732 by spring 762 via coupling 758, chamber 744 and an axle (not shown) that couples chamber 744 to blade 732.

Thus, as described above with reference to FIGS. 5A-D, in addition to reducing slack in the hose in which the spring is integrated, the spring may operate to drive the translation of the power tool or working element with which the spring is associated. More particularly, in the embodiments of FIGS. 5A-D, after the blade has been driven in a working direction of cut, the spring operates to pull or push the blade back to a reset position from which the blade may again make a cut in a working direction. It is further possible for the spring to operate to drive other types of movement of the power tool or working element with which the spring is associated. For example, it would be possible for a hose that is generally aligned with axis of rotation 38 in FIG. 2 to drive pivoting of blade 32 in one rotational direction or the other about an axis (not shown) that is parallel to directions 36.

Another embodiment of a hose 152 that is suitable for use in the embodiments of the invention described herein is shown in FIGS. 6B-C in a compressed position. As illustrated in the more detailed view of FIG. 6C, hose 152 is formed of a single layer 166 of a flexible plastic, such as PVC, which includes spiraling, hair pin-shaped folds 168 in which an extension coil spring 162 is retained. More particularly, each hair pin-shaped fold 168 includes a pocket 170 in which spring 162 may be retained. Although there appear to be a series of aligned folds 168 in FIG. 6C, it is to be understood that it may be in actuality one continuous spiraling fold 168 that encapsulates one continuous spiraling spring 162. In one embodiment, spring 162 may be formed of metal.

In one embodiment a hose 152 suitable for use in push-pull saw 20 may have a compressed length 172 of about 135 millimeters and a width 174 of about 38 millimeters. In a fully expanded position, hose 152 may have a length of about 270 millimeters in one embodiment. A pitch 176 between adjacent folds 168 in the compressed state may be about 2.4 millimeters. The hose 152 may take any form (having various scales, sizes, or dimensions) based upon the intended applications and operating conditions.

Figure 7:
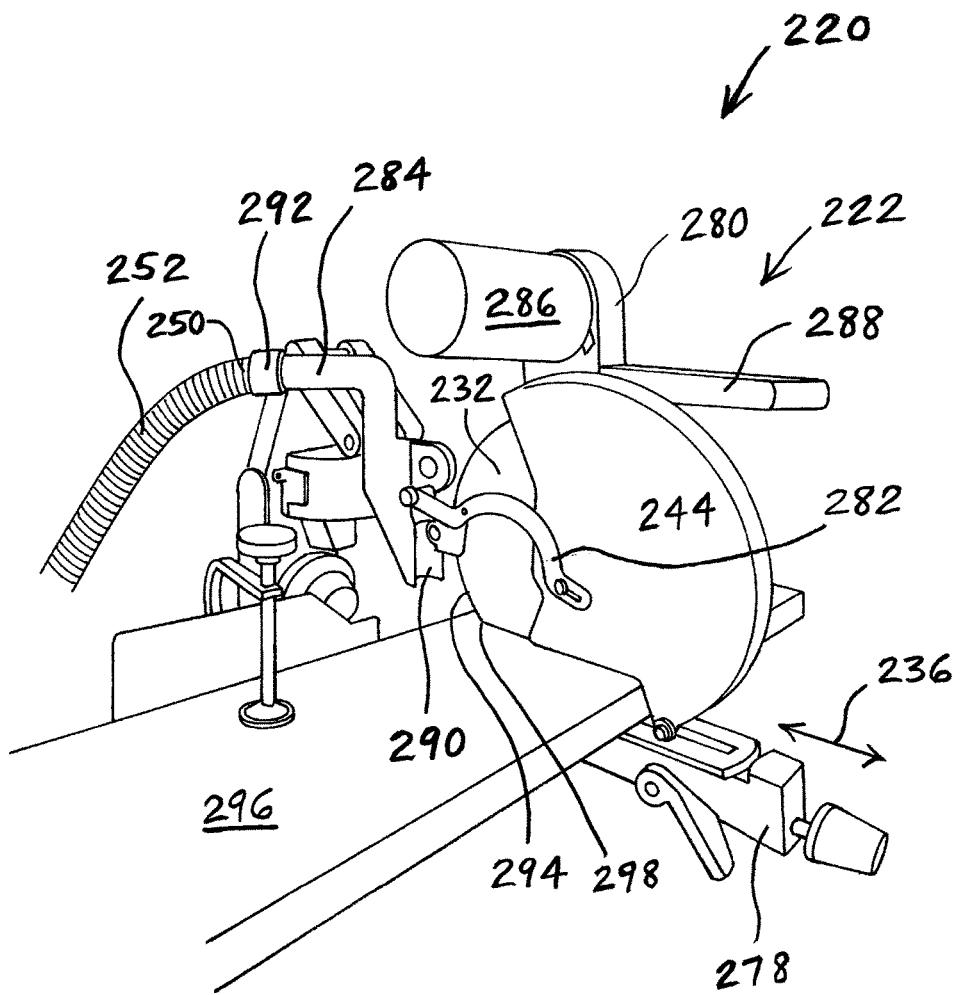
FIG. 7 is a perspective view of a miter saw arrangement in accordance with one embodiment of the present invention.

In the embodiment illustrated in FIG. 7, the present invention is applied to a benchtop tool in the form of a hinged sliding miter or "glide" saw 220. Saw 220 includes a frame 222 having a base part 278, a support member 280, a protective hood 244 and a bracket 282. A motor 286 and a handle 288 may be attached to support member 280. Bracket 282 may fixedly interconnect hood 244 with a rigid vacuum conduit 284. Conduit 284 includes an input port 290 and an output port 292. Input port 290 may be positioned in association with a cutting edge 294 of a translatable circular saw blade 232. Blade 232 may be translatable in the sense that the blade 232 may be moved in back and forth directions indicated by double arrow 236. Conduit 284 includes an interior channel (not shown) fluidly interconnecting input port 290 and output port 292. Blade 232 may rotate about an axis and engage (e.g., cut) a work piece in the form of a wooden board 296.

Output port 292 may be sealingly connected to one end 250 of a spring-loaded hose 252. An opposite end (not shown) of hose 252 may be sealingly connected to vacuum device (not shown).

During use, throughout the back and forth movement of blade 232 in directions 236, input port 290 remains closely positioned (e.g., within three inches) to cutting edge 294 of blade 232 and/or to a point 298 at which cutting edge 294 intersects a top surface of board 296. As blade 232 rotates and cuts through board 296, the sawdust created thereby may be drawn into input port 290, through conduit 284, through hose 252 and into the vacuum device. Although the embodiment of FIG. 7 is shown as being used in conjunction with a miter saw, it is to be understood that the embodiment may be used with a table saw and other types of power tools.

Figure 8:
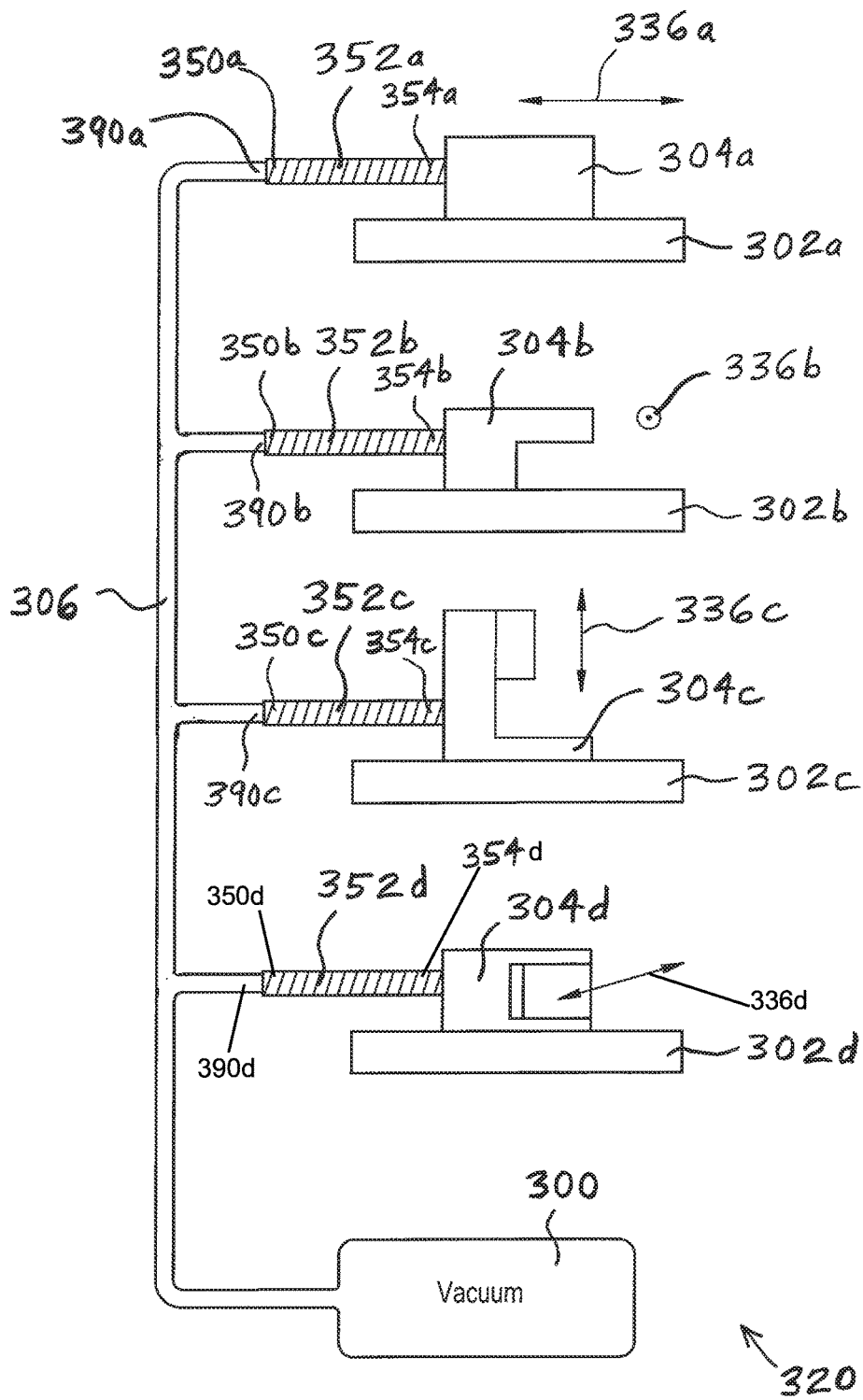
FIG. 8 is a schematic diagram of a spring loaded hose power tool arrangement in accordance with one embodiment of the present invention.

Illustrated in FIG. 8 is a power tool arrangement 320 including several benchtop power tools each fluidly connected to a common vacuum device 300. In the specific example embodiment of FIG. 8, there are four work benches 302a-d each supporting a respective one of power tools 304a-d. Each of tools 304a-d is fluidly connected to vacuum device 300 via a common vacuum conduit 306 and via a respective one of spring loaded hoses 352a-d. Each of tools 304a-d may be translatable or movable in respective back and forth directions, and these movements may be accommodated by the expansion and contraction of a respective one of hoses 352a-d. Specifically, power tool 304a is movable in back and forth directions indicated by double arrow 336a. While a first end 350a of hose 352a is fixedly attached to an input port 390a of conduit 306, a second end 354a of hose 352a is fixedly attached to power tool 304a. As tool 304a moves in directions 336a, hose 352a expands and contracts to maintain tool 304a in fluid communication with conduit 306.

Similarly, power tool 304b is movable in back and forth directions into and out of the page of FIG. 8 as indicated by arrow 336b. While a first end 350b of hose 352b is fixedly attached to an input port 390b of conduit 306, a second end 354b of hose 352b is fixedly attached to power tool 304b. As tool 304b moves in directions 336b, hose 352b expands and contracts to maintain tool 304b in fluid communication with conduit 306. Along with the expansion and contraction, hose 352b moves to varying degrees along its length in directions 336b.

Further, power tool 304c is movable in back and forth vertical directions as indicated by arrow 336c. While a first end 350c of hose 352c is fixedly attached to an input port 390c of conduit 306, a second end 354c of hose 352c is fixedly attached to power tool 304c. As tool 304c moves in directions 336c, hose 352c expands and contracts to maintain tool 304c in fluid communication with conduit 306. Along with the expansion and contraction, hose 352c moves to varying degrees along its length in directions 336c.

Finally, power tool 304d is movable in back and forth directions as indicated by arrow 336d. While a first end 350d of hose 352d is fixedly attached to an input port 390d of conduit 306, a second end 354d of hose 352d is fixedly attached to power tool 304d. As tool 304d moves in directions 336d, hose 352d expands and contracts to maintain tool 304d in fluid communication with conduit 306. Along with the expansion and contraction, hose 352d moves to varying degrees along its length in vertical directions due to the vertical component of directions 336d. Further, along with the expansion and contraction, hose 352d moves to varying degrees along its length in horizontal directions due to the horizontal component of directions 336d.

Each of hoses 352a-d may include either an expansion spring or a compression spring, which may depend on the type of tool to which the hose is coupled. For example, if tool 304a is manually-driven or motor-driven in the right-hand direction in FIG. 8, then spring 352a may be an expansion spring that resists the movement of tool 304a in the right-hand direction, and pulls tool 352a back in the left-hand direction. However, tool 304a may perform work while moving in either or both of right-hand and left-hand directions 336a. That is, the working element of 304a may engage an associated work piece on bench 302a while tool 304a moves in either or both of right-hand and left-hand directions 336a.

Power tool arrangement 320 may be employed in a workshop including an integrated dust extraction system that connects to the various tools in different ways. Thus, such intermitting tools may be connected to the same dust extraction system.

Although benches 302a-d are shown in FIG. 8 as each being on a different vertical level, it is to be understood that the benches may have any vertical or horizontal positions relative to each other. In one particular embodiment, each of the benches has an approximately equivalent vertical position.

Figure 9:
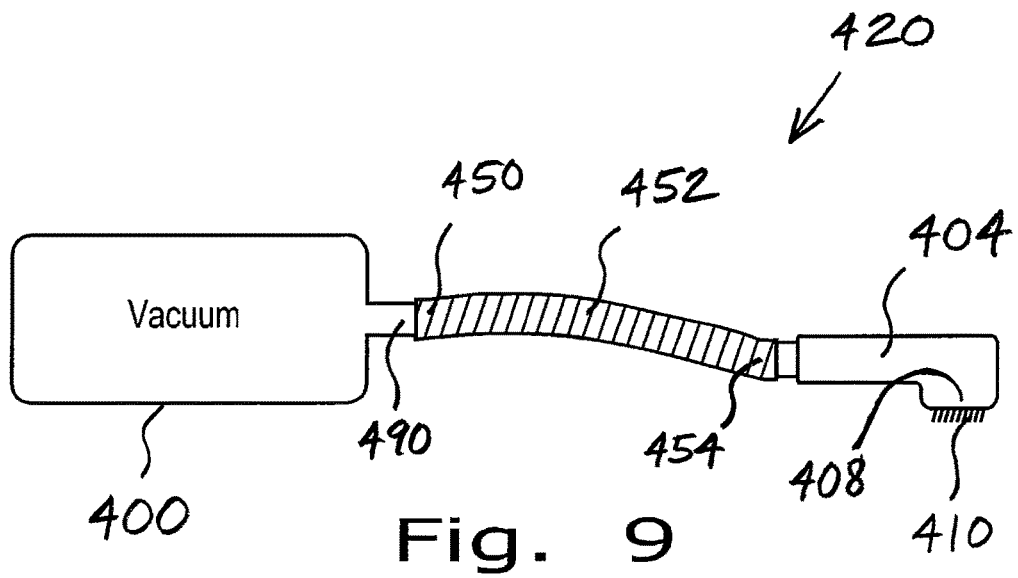
FIG. 9 is a side view of a hand power tool arrangement in accordance with one embodiment of the present invention.
Figure 10:
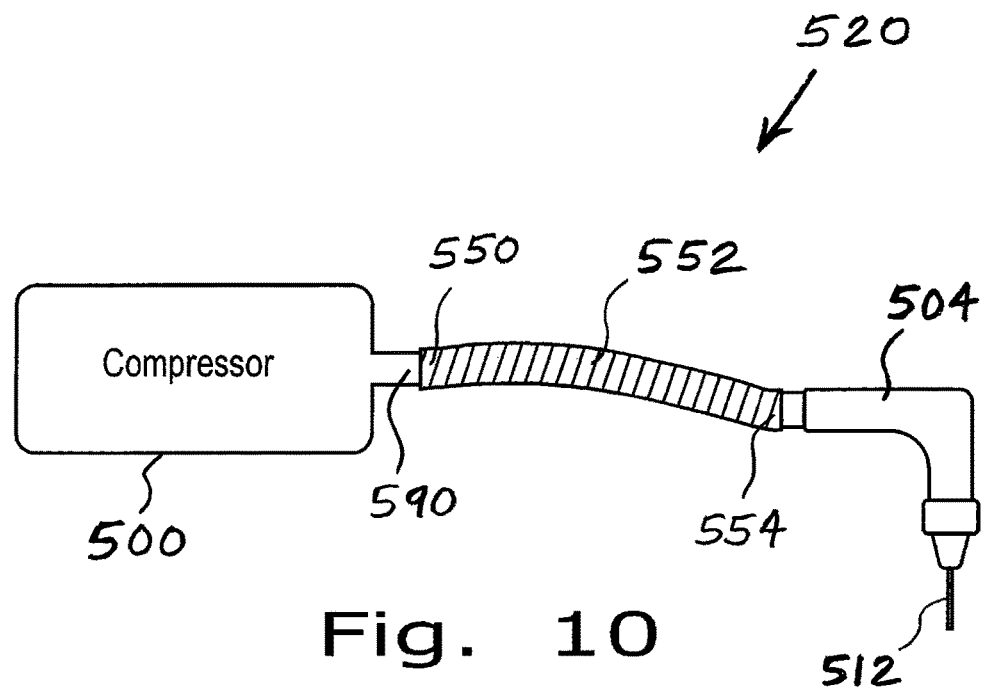
FIG. 10 is a side view of a pneumatic hand power tool arrangement in accordance with one embodiment of the present invention.

As illustrated in the embodiments of FIGS. 9 and 10, the invention may be applied to hand tools (e.g., power tools operated while being held in the air by a user) as well as to benchtop tools (e.g., power tools permanently installed on a bench top). Specifically, FIG. 9 illustrates a hand-operated vacuum tool arrangement 420 including a vacuum device 400 in fluid communication with a hand-operated vacuum tool 404 having a suction port 408 equipped with a brush interface 410. While a first end 450 of hose 452 is fixedly attached to an input port 490 of vacuum device 400, a second end 454 of hose 452 is fixedly attached to power tool 404. While vacuum device 400 may be relatively heavy and immobile, a user may manually move vacuum tool 404 to any location at which there is dust, dirt and/or debris that needs to be collected in vacuum device 400 via hose 452 and tool 404. As tool 404 is moved in lateral and vertical directions relative to vacuum 400, spring-loaded hose 452 expands and contracts to maintain tool 404 in fluid communication with vacuum 400.

In the specific example embodiment of FIG. 10, the present invention is applied to not just a hand tool, but to a pneumatic or air-driven hand tool. Particularly, FIG. 10 illustrates a hand-operated pneumatic drill arrangement 520 including an air compressor 500 in fluid communication with a hand-operated pneumatic drill 504 having a drill bit 512 rotatingly driven by compressed air received from air compressor 500 via spring-loaded hose 552. While a first end 550 of hose 552 is fixedly attached to an output port 590 of air compressor 500, a second end 554 of hose 552 is fixedly attached to power tool 504. While air compressor 500 may be relatively heavy and immobile, a user may manually move drill 504 to any location at which the working element drill bit 512 needs to be applied. As drill 504 is moved in lateral and vertical directions relative to air compressor 500, spring-loaded hose 552 expands and contracts to maintain drill 504 in fluid communication with air compressor 500.

Figure 11:
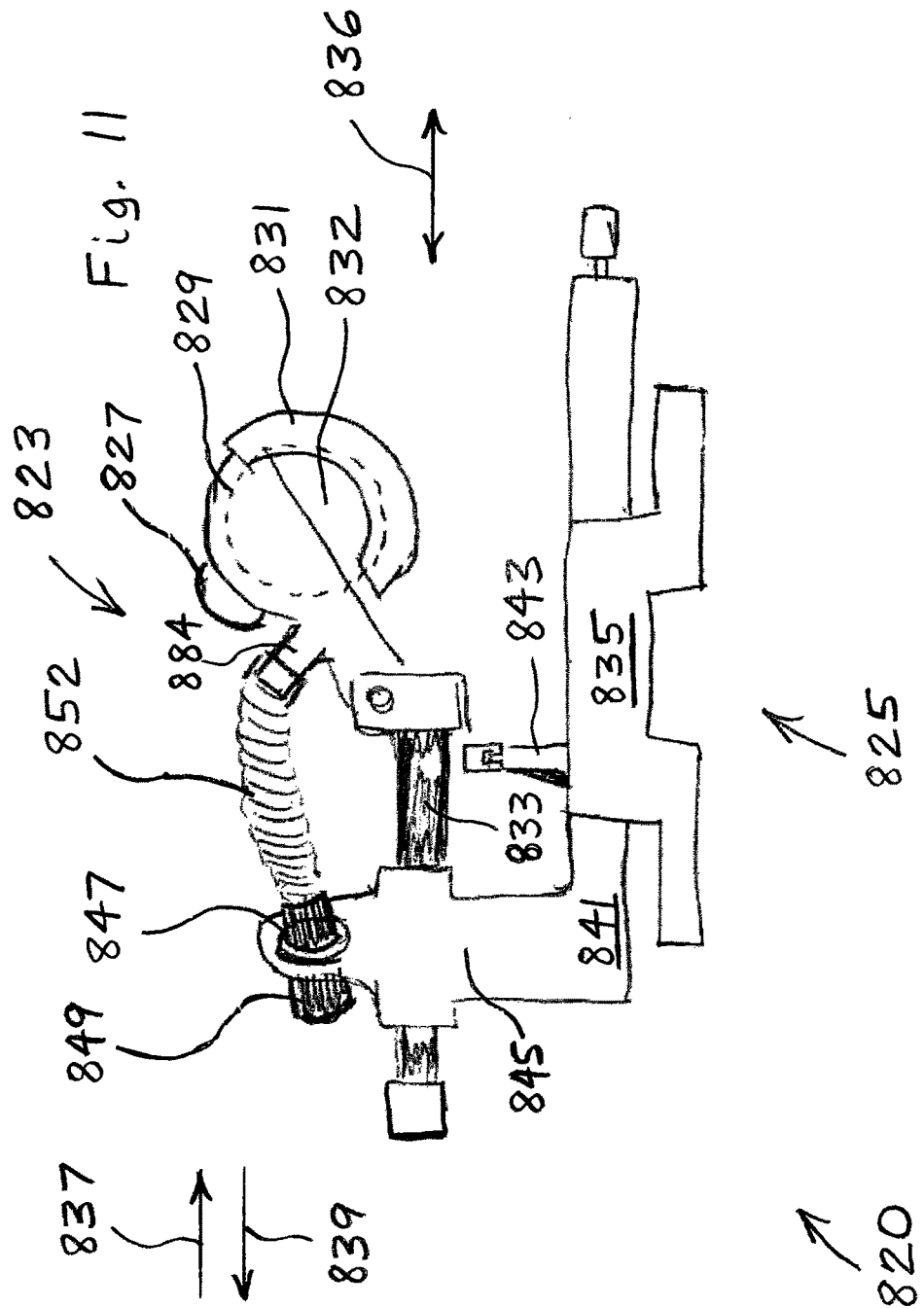
FIG. 11 is a schematic, side view of another miter saw arrangement in accordance with one embodiment of the present invention.
Figure 12:
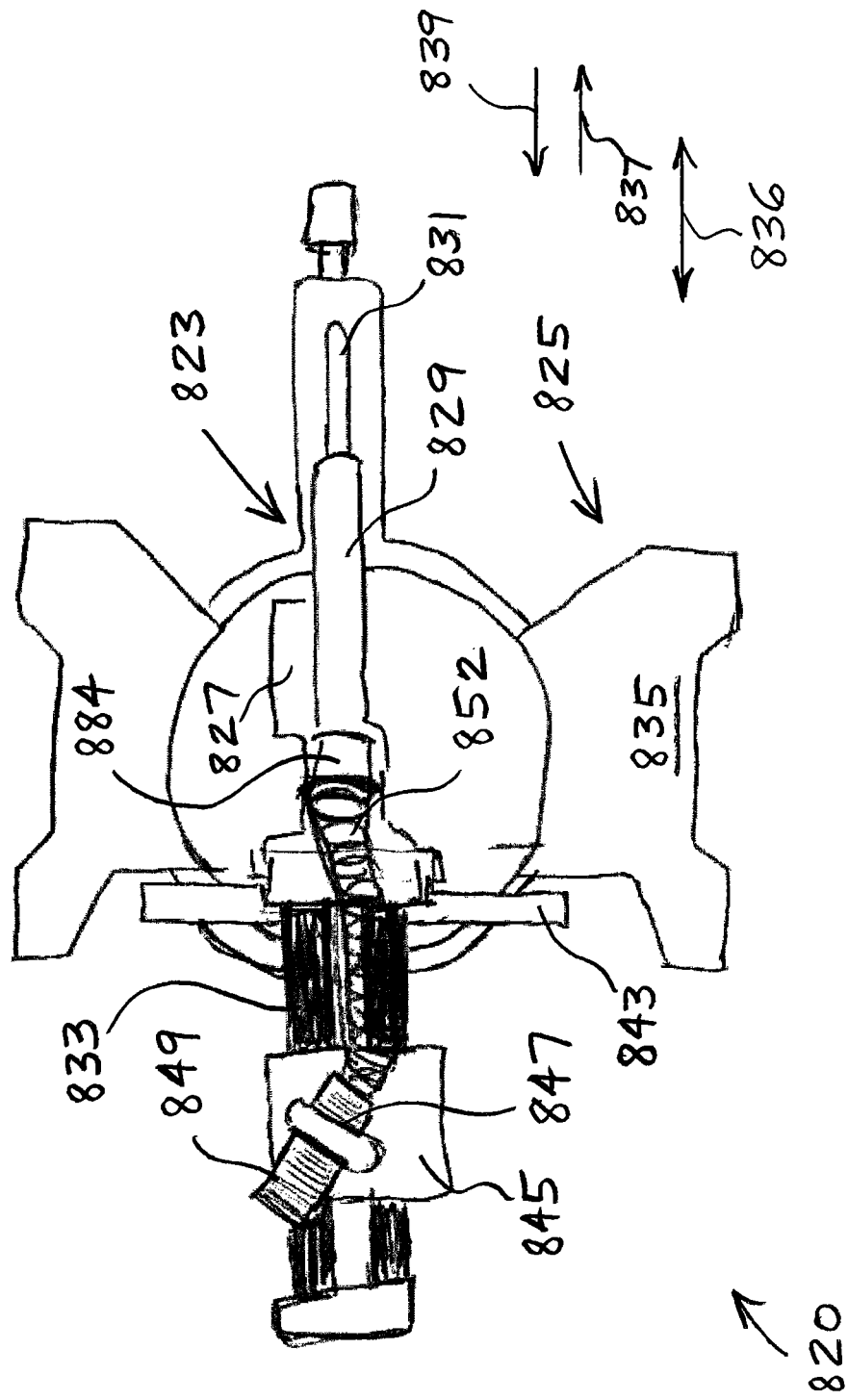
FIG. 12 is a schematic, top view of the miter saw arrangement of FIG. 11.

Illustrated in FIGS. 11-12 is one embodiment of a non-hinged, standard sliding miter saw arrangement 820 of the invention including a sliding portion 823 and a fixed portion 825. Sliding portion 823 may include a motor 827, upper guard 829, lower guard 831, blade 832 and sliding rails 833. Fixed portion 825 may include a base 835 (supported on the ground or on a benchtop), sub base 841 and fence 843. Sub base 841 includes a tower 845 including a through hole 847 for receiving and retaining an adaptor 849. Adaptor 849 may be coupled to a spring-loaded hose 852 that is also coupled to coupling 884 and thereby interconnects sliding portion 823 and fixed portion 825.

In operation, sliding portion 823 may translate in back and forth directions 836. As sliding portion 823 moves to and fro, hose 852 expands and contracts to thereby maintain adaptor 849 in air-tight fluid communication with coupling 884. If hose 852 is equipped with an extension coil spring, then the spring may tend to maintain hose 852 in a compressed state. Movement of sliding portion 823 in working direction 837 may overcome the compressive force of the spring. After the working cut in direction 837, however, the spring may operate to pull sliding portion 823 back in direction 839. Alternatively, or in addition, sliding portion 823 may be manually or motor-driven in direction 839 as well as in working direction 837.

Figure 13:
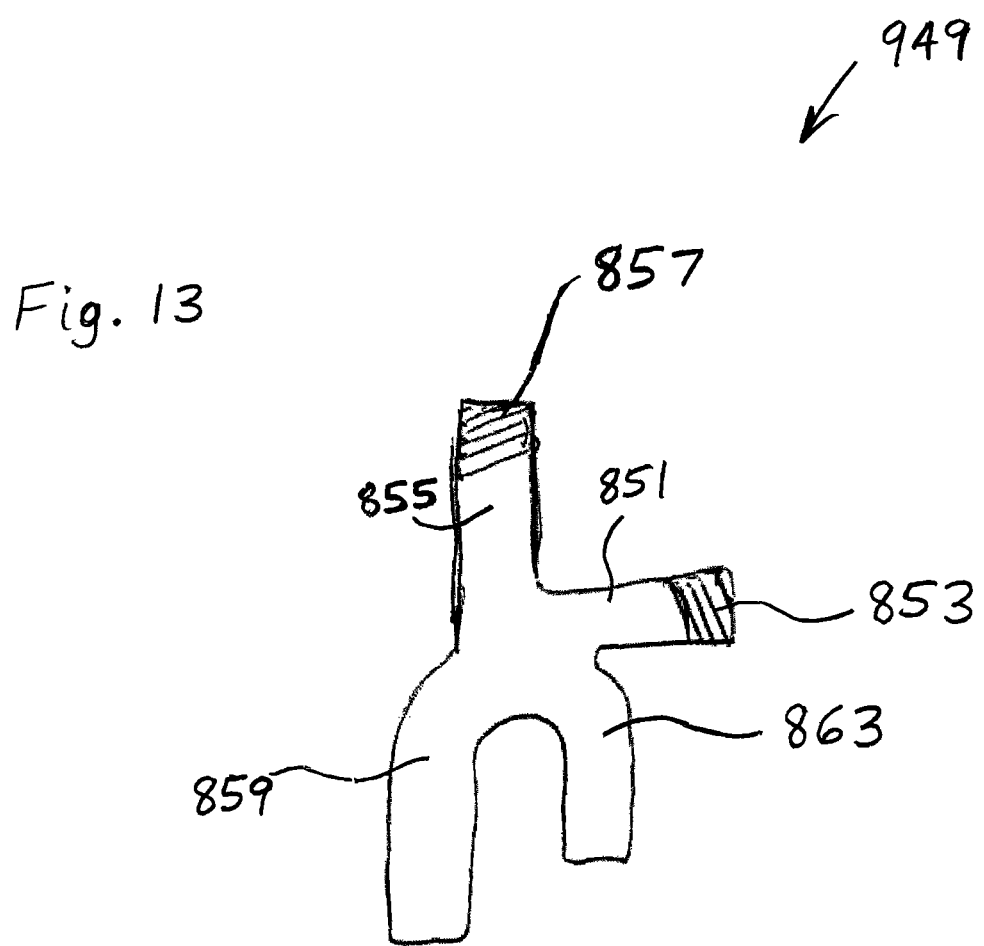
FIG. 13 is a plan view of one embodiment of a hose adaptor of the present invention.

Adaptor 849 may be fluidly connected to a vacuum device. In FIG. 13 there is illustrated a multi-legged adaptor 949 that may be suitable to direct a vacuum or compressed air to several different locations. The several different locations may be associated with the same power tool, or may be associated with more than one power tool.

Figure 14:
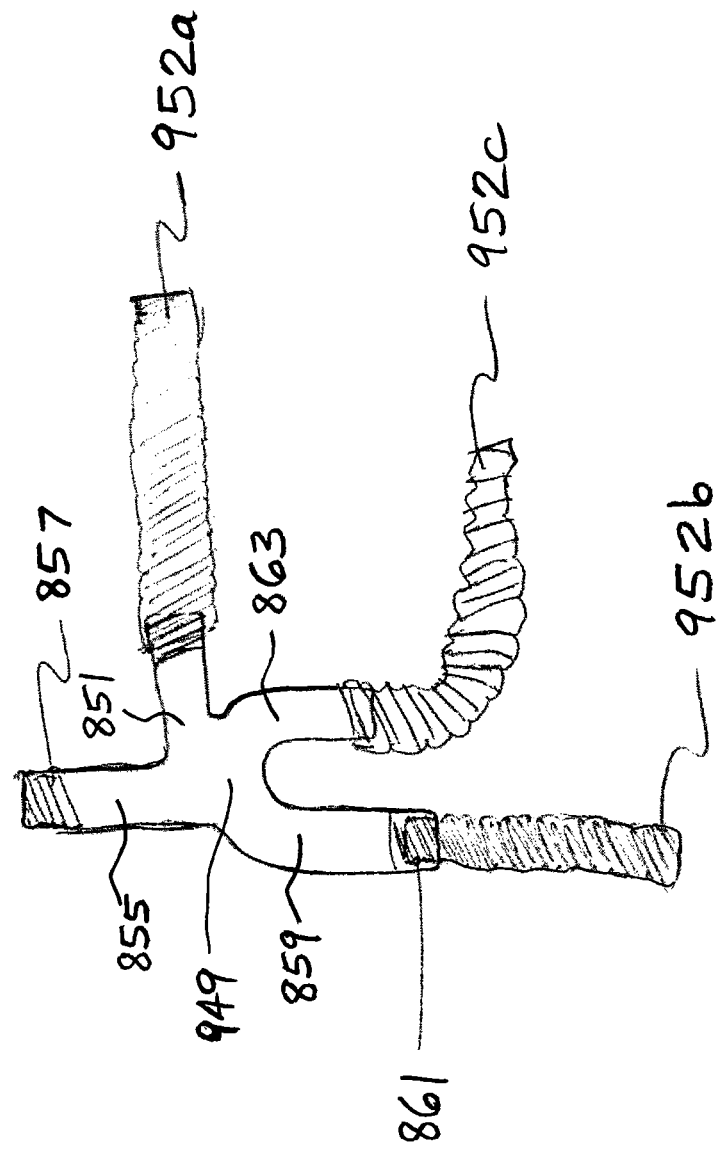
FIG. 14 is a plan view of the hose adaptor of FIG. 3 coupled to several example hoses.

Adaptor 949 may possibly be used in place of adaptor 849. For example, a first leg 851 with external threads 853 may be inserted into through hole 847 and threadedly coupled to an internally threaded spring-loaded hose 952a (FIG. 14). Another leg 855 with external threads 857 may be fluidly coupled to a vacuum device (not shown) or to an air compressor (not shown). Yet another leg 859 may have internal threads 861 for threaded coupling to an externally threaded spring-loaded hose 952b. Still another leg 863 may be sealingly coupled to a non-spring-loaded hose 952c. The distal ends of hoses 952a-c may be coupled to a same power tool, or to different, respective power tools, for example.

Although the example embodiments of the invention are generally described herein as being used in conjunction with a vacuum device for the sake of simplicity, it is to be understood that these embodiments may equally be usable in conjunction with an air compressor. For example, any of the benchtop tools shown and described herein may alternatively be pneumatic or air-driven tools fluidly connected to an air compressor. Such tools may use air as a driving element (e.g., with turbines) to power a drive train mechanism.

In the embodiments described herein, the spring has been described as extending along the entire length of the hose. However, it is to be understood that it is also possible within the scope of the invention for the spring to be present in only a portion of the length of the hose, e.g., within a middle portion of the hose.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A power tool arrangement, comprising:
  a power tool including a working element configured to engage a work piece, wherein the working element is movable between a first position and a second position;
  a vacuum device;
  a hose including first and second opposite ends; and
  a biasing device configured to bias the hose into one of a longitudinally compressed position and a longitudinally expanded position, the first end fluidly coupled to the vacuum device, and the second end fluidly coupled to the vacuum device through the first end and connected to the working element such that the second end follows the working element, and the hose is configured to compress and expand substantially linearly as the working element moves between the first position and the second position, wherein the biasing device is operatively coupled to the hose and configured to bias the hose such that a biasing force is exerted on the working element sufficient to move the working element from the second position to the first position.

2. The arrangement of claim 1 wherein the biasing device comprises an extension coil spring.

3. The arrangement of claim 1 wherein the vacuum device is configured to collect debris produced by the engagement of the work piece by the working element such that the debris is collected via the hose throughout the compression and expansion of the hose.

4. A power tool arrangement, comprising:
  a power tool including a working element configured to engage a work piece during movement of the working element in a straight line from a first position to a second position;
  a vacuum device;
  a hose including first and second opposite ends; and
  a biasing device configured to bias the hose toward a longitudinally compressed position, the first end fluidly coupled to the vacuum device, and the second end fluidly coupled to the vacuum device through the first end and connected to the working element such that the second end follows the working element as the working element selectively moves:
    away from the first end and the hose thereby undergoes longitudinal expansion; and toward the first end and the hose thereby undergoes longitudinal compression, wherein the biasing device is configured to produce a biasing force of a magnitude that can be overcome by an actuating force exerted on the working element such that the hose longitudinally expands in response to the actuating force and longitudinally retracts from a longitudinally expanded condition in response to an absence of the actuating force.

5. The arrangement of claim 4 wherein the biasing device comprises an extension coil spring.

6. The arrangement of claim 4 wherein:

the second end of the hose is coupled to the power tool such that the second end has a fixed position relative to the working element;

the working element is configured to engage the work piece as the working element moves along an axis from the first position to the second position; and the biasing device is configured to provide the biasing force along the axis.

7. The arrangement of claim 4 wherein the vacuum device is configured to collect debris produced by the engagement of the work piece by the working element such that the debris is collected via the hose throughout compression and expansion of the hose.

8. The arrangement of claim 4 wherein the biasing device is configured to move a working element from a working position to the non-working position in the absence of the actuating force.

9. The power tool arrangement of claim 4, wherein the hose is configured to compress substantially linearly whenever the hose undergoes longitudinal compression.

* * * * *